United States Patent [19]

Russ et al.

[11] 4,437,612

[45] Mar. 20, 1984

[54] FLOTATION NOZZLE

[75] Inventors: Stephen Russ, Point Claire; Don McAnespie, Montreal, both of Canada

[73] Assignee: Midland-Ross Corporation, Cleveland, Ohio

[21] Appl. No.: 334,916

[22] Filed: Dec. 28, 1981

[51] Int. Cl.³ .............................................. B05B 1/14
[52] U.S. Cl. ..................................... 239/556; 226/97; 239/598
[58] Field of Search .................. 34/155, 156, 160; 226/97; 239/556, 557, 558, 559, 567, 598

[56] References Cited

U.S. PATENT DOCUMENTS

| 3,023,420 | 11/1971 | Larkfeldt et al. | 239/559 |
| 3,385,490 | 5/1968 | Malmgren et al. | 226/97 |
| 3,737,108 | 6/1973 | Stumpenhauzer et al. | 239/598 |
| 4,021,931 | 5/1977 | Russ et al. | 226/97 |
| 4,218,001 | 8/1980 | Vits | 239/556 |

*Primary Examiner*—John J. Love
*Assistant Examiner*—Jon Rastello
*Attorney, Agent, or Firm*—Harlan E. Hummer

[57] ABSTRACT

A flotation nozzle is described as having an enclosed chamber with unique fluid emitting orifices which are angularly oriented to produce a desired, directional flow of fluid. One such orifice is a dimple-shaped cavity which extends inwardly of the chamber and has a circular opening in the downstream portion of the dimple, relative to the flow of fluid in the chamber. The opening is tilted so that the direction in which the fluid flows from the opening substantially coincides with the resultant velocity vector of the velocity vectors due to static and dynamic fluid pressures at the orifice.

14 Claims, 9 Drawing Figures

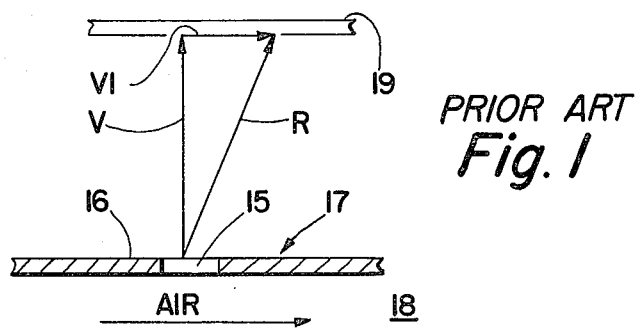
PRIOR ART
Fig. 1
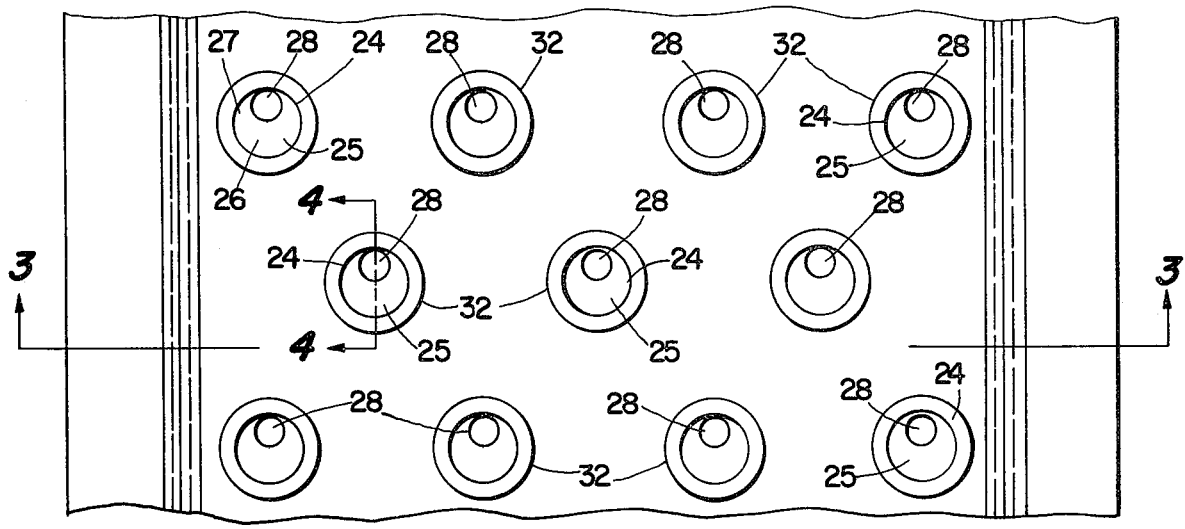
Fig. 2
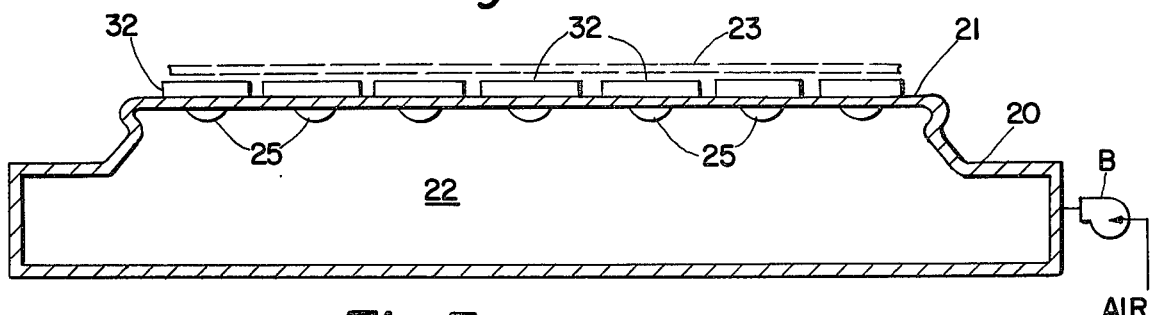
Fig. 3
Fig. 5
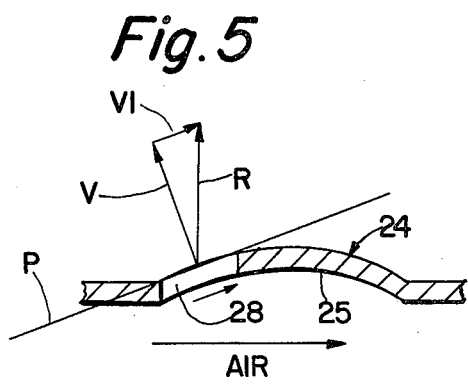
Fig. 4
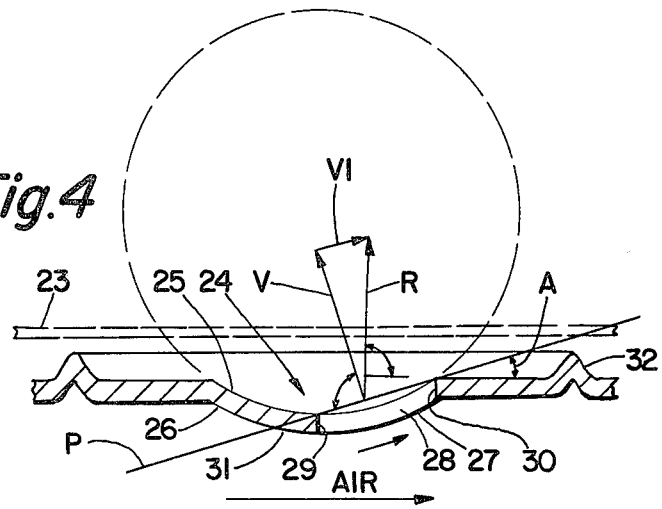

FLOTATION NOZZLE

BACKGROUND OF THE INVENTION

The invention is well suited for a nozzle which is used in the treatment of a web that is composed of any suitable material, e.g. metal, textile, pulp, or paper. One such nozzle, described in U.S. Pat. No. 4,021,931, has a relatively long tapering chamber in which fluid is circulated. The nozzle is provided with a number of orifices through which fluid flows from the chamber for impingement against an adjacent traveling web. This particular nozzle is unique in that it provides a deflector tab which is attached to the upstream side of each orifice and extends into the chamber in an upstream direction. This tab arrangement has been found to be effective in eliminating the velocity vector or component resulting from dynamic fluid pressure at the orifice, thereby leaving only the velocity vector resulting from static fluid pressure at the orifice. The elimination of this vector causes fluid to flow from the orifice in a direction such that the fluid impinges against an adjacent traveling web in a direction normal to the plane of the web, such impingement being the most preferred and beneficial, but difficult to achieve. One of the problems of this particular tab arrangement, however, is that lint or other such materials carried by the hot air used, for example, in the drying of the web, becomes caught on the upstream side of the tab and eventually builds-up to partially block the chamber and orifice and reduce the effectiveness of the nozzle. The invention is directed to an improved orifice which is oriented to prevent the accumulation of such material and produce a desired directional impingement of fluid against an adjacent web.

Briefly stated, the invention is in a nozzle for impinging fluid against a traveling web. The nozzle comprises a fluid emitting wall which at least partially encloses a chamber in which fluid is circulated, under pressure, and a plurality of orifices which are disposed in the wall in communication with the chamber and through which fluid passes from the chamber. The nozzle is characterized by means for direction fluid from the plurality of orifices in a desired direction including means for positioning the orifices so that the resultant vector of vectors representing fluid velocities due to static and dynamic pressures at the orifices, is in the desired direction.

The foregoing invention can be achieved by an orifice that comprises a dimple-shaped cavity that can be equally divided into two portions, an upstream portion and a downstream portion, relative to the flow of fluid in the chamber past a dividing line of the cavity between the portions. The orifice further comprises an opening in the downstream portion of the cavity when the cavity extends into the chamber. Similar results can be achieved when the opening is placed in the upstream portion of a cavity which extends outwardly of the chamber. In both cases, the opening is in tilted relation such that the resultant velocity vector, as indicated above, is in the desired direction of flow which is preferable normal to the plane of a web which travels adjacent the nozzle.

The invention can also be achieved by utilizing a conventional orifice in combination with a tab which is attached to the upstream side of the orifice and extends into the chamber in a downstream direction to form between the free end of the tab and the downstream side of the orifice, a restricted opening, the plane of which is similarly tilted so that the resultant velocity vector is in the desired direction of flow which is preferably normal to the plane of the traveling web.

It can be appreciated that the inventive concept can be utilized to determine and produce any desired directional flow or impingement of fluid against a traveling web which, in the past, has largely been accomplished by trial and error experimentation.

DESCRIPTION OF THE DRAWING

The following description of the invention will be better understood by having reference to the accompanying drawing, wherein:

FIG. 1 is a section of a conventional orifice and illustrates a typical velocity vector diagram due to static and dynamic fluid pressure at the orifice;

FIG. 2 is a plan view of a portion of a nozzle that is made in accordance with the invention;

FIG. 3 is a section of the nozzle viewed from the line 3—3 of FIG. 2, in combination with a traveling web that is shown in dotted line;

FIG. 4 is an enlarged section viewed from the line 4—4 of FIG. 2;

FIG. 5 is a section, similar to FIG. 4, but of a different embodiment of the invention;

DETAILED DESCRIPTION OF THE DRAWING

Figure 6:
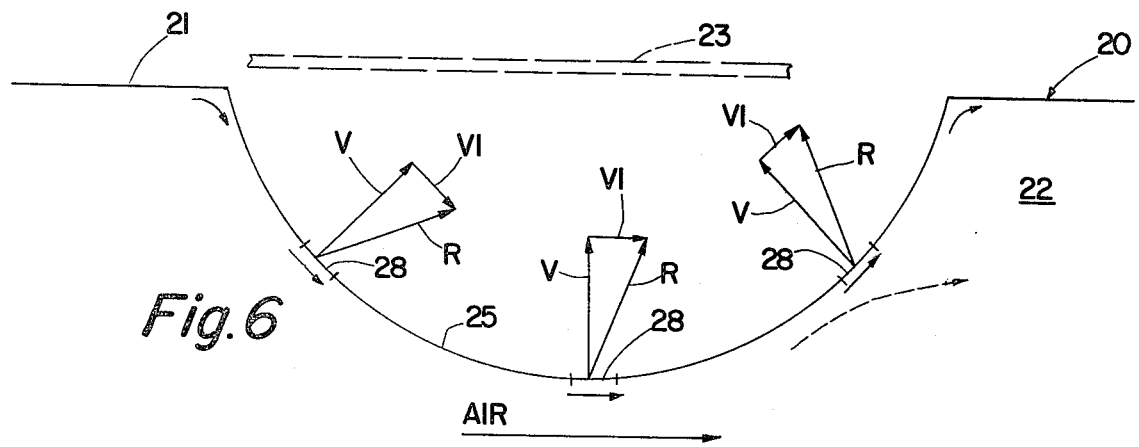
FIG. 6 is a schematic side view of a dimple-shaped orifice of the invention, and is designed to show velocity vector diagrams caused by fluid exiting openings which are located in different areas of the dimple.

The unique concept of the invention is best understood by first having reference to FIG. 1 which, as indicated above, shows a typical, circular orifice 15 that is formed in a fluid emitting wall 16 of a nozzle 17 that has a chamber 18 in which any suitable fluid is circulated, under pressure, for emission from the orifice 15 and subsequent impingement against a web 19 traveling adjacent thereto. It is well known that static fluid pressure at the orifice causes fluid to exit the orifice 15 in a direction which is substantially normal to the plane of the orifice and at a velocity which is represented by the vector V. As previously indicated, this is the most desirable direction of impingement against the traveling web. It is also well known that dynamic fluid pressure at the orifice produces a velocity vector V1 which generally parallels the directional flow of fluid across the orifice, which flow in this instance parallels the plane of the orifice. The resultant velocity vector R of the velocity vectors V and V1 represents or shows the actual direction in which fluid passes from the orifice 15 for impingement against the traveling web. Tabs are presently used adjacent the orifices to deflect or direct fluid from the orifices in a particular direction which, hopefully, will be normal to the plane of the traveling web, or to eliminate the effect of the dynamic pressure, so that only the static pressure will influence the directional flow of fluid from the orifices.

Applicants' invention is concerned with the capitalization of the effects of dynamic pressure on directional fluid flow, rather than the elimination of such effects. It has been discovered that any desired direction of fluid flow from an orifice can be achieved by simply tilting the plane of the orifice, so that the resultant velocity vector R of the velocity vectors V and V1, due to static and dynamic fluid pressures, will be in the desired direction of fluid flow. To accomplish the most beneficial, normal impingement referred to above, the orifice is tilted in what might be viewed as a backward direction, wherein the inner surface of the nozzle or chamber surrounding the orifice faces generally downstream and the outer surface of the nozzle surrounding the orifice and closest the traveling web, faces generally upstream. It can be appreciated from the above that the tilted or angular position of an orifice can be adjusted to accommodate various velocities at which fluid is circulated through the nozzles.

Keeping the foregoing in mind, general reference is had to the remaining figures of the drawing for like parts and more specific reference is had to FIGS. 2-4 which are directed to the preferred embodiment of the invention which comprises a flotation-type nozzle 20 that has a fluid emitting wall 21 which at least partially encloses a chamber 22 in which any suitable fluid, e.g. air, is circulated, under pressure, by any suitable means such as a conventional fan or blower B (schematically shown). The nozzle 20 is used, for example, with a number of like nozzles in a drying apparatus to impinge hot air against any suitable web 23 that needs drying and travels in generally parallel relation from the fluid emitting surface 21 which can be planar or flat as shown in U.S. Pat. No. 4,021,931, or can be substantially flat, having a slight curvature as shown, for example, in U.S. Pat. Nos. 3,957,187 or 3,982,327. In any case it is desired to have the fluid leave the nozzle in a direction such that it will impinge against the traveling web 23 in a direction which is substantially normal to the plane of the web. A plurality of any suitably configured, similar orifices 24 are disposed in the flat wall 21 in communication with the chamber 22 for directing fluid from the chamber against the traveling web 23.

The orifices 24, in this instance, each comprise a spherical or dimple-shaped depression or cavity 25 which is recessed inwardly of the flat wall 21 into the chamber 22. The spherical cavity 25, i.e. segment of a sphere shown in dotted line, can be said to be equally divided into an upstream portion 26 and downstream portion 27, relative to the direction in which the air circulates through the chamber 22 (note arrow). Each orifice 24 further comprises a generally circular opening 28 that is punched or cut into the downstream portion 27 of the cavity 25. The opening 28 lies in a plane P which is tilted backwardly at an acute angle A, relative to the flat wall 21 or plane thereof, such that the resultant velocity vector R of the vectors V and V1, due to static and dynamic fluid pressures at the opening 28, is in a direction normal to the plane of the traveling web 23, which direction is also normal to the plane of the fluid emitting wall 21, since the web travels parallel to the wall. Each opening 28 is at an acute angle A of less than 90°, and in the broad range of from 0° to 25°, and in the narrower preferred range of from 10° to 20°. The opening 28 has a leading edge or upstream side 29 and a trailing edge or downstream side 30. The upstream portion 26 of the cavity 25, adjacent the leading edge 29 of the opening 28, generally extends into the chamber 22 in a downstream direction and acts as a tab in directing or deflecting air around the inner curved surface 31 of the cavity 25.

An annular upstanding ridge 32 may be provided around each of the orifices 24 to act as reservoirs of fluid to form individual fluid beds or cushions to help support the traveling web 23 free of the nozzle 20.

With particular reference to FIG. 5, there is shown a spherical cavity 25 which extends or projects outwardly of the chamber 22. It can be appreciated from a comparison of FIGS. 4 and 5 that, in order to maintain the same angular relationship of the opening 28 and consequent normal impingement of fluid against the traveling web 23, the opening 28 must be located in the upstream portion 26 of the outwardly projecting cavity 25, rather than in the downstream portion 27. It should be apparent that, because of the particular location of the opening 28 in this instance, there is no need for a tab, as described in reference to FIG. 4.

With particular reference to FIG. 6, there is schematically shown velocity vector diagrams of openings in various portions of spherical cavity 25 which is recessed inwardly of the chamber 22. It can be appreciated from this, that orifices can be deliberately positioned to produce a particular directional impingement of fluid against an adjacent traveling web. In FIG. 6, it is assumed that the directional flow of fluid across each opening is parallel to the plane of the orifice. This is generally true when the plane of the opening is tilted backwardly at an angle A (FIG. 4) of from 0° to about 25°, or in the narrower range of angles of from 10° to 20° with which the invention is primarily concerned. It was discovered that the stream or flow of fluid separated from the inner curved wall 31 of the cavity 25, as shown in dotted line and arrow, when the opening was tilted at an angle A of about 30°. The angle of the velocity vector V1 due to dynamic fluid pressure was found to correspondingly vary, and not parallel the plane of the opening. The direction of the resultant velocity vector R changed accordingly. The angle at which the airstream separates from the inner curved surface 31 is dependent on such well known factors as the Reynold's Number, the smoothness or roughness of the inner surface 31, etc. It is theorized that at angles A greater than 30°, the flow of fluid can become so separated as to cause elimination of the velocity vector due to dynamic fluid pressure, so that only the velocity vector due to static fluid pressure will have any effect on the direction which fluid flows from the orifices.

Figure 7:
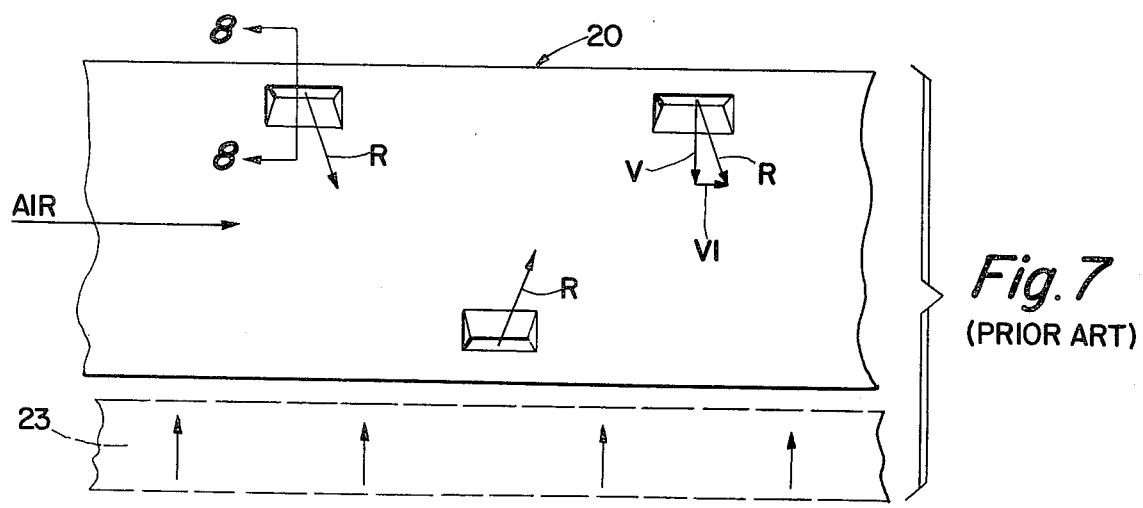
FIG. 7 is a plan view of a portion of a prior art nozzle as described, for example, in U.S. Pat. Nos. 3,982,327 or 3,957,187.
Figure 8:
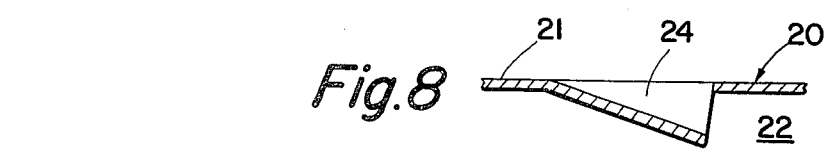
FIG. 8 is a section of the prior art nozzle viewed from the line 8—8 of FIG. 7.

With particular reference to FIGS. 7 and 8, there is shown a nozzle which is similar to the nozzle shown and described in U.S. Pat. Nos. 3,957,187 or 3,982,327. It can be appreciated from the vector diagram shown, that the resultant velocity vector R lies in a plane which is angularly disposed to the direction in which the web 23 travels across the nozzle 20. The fluid correspondingly flows angularly from each of the orifices in a generally downstream direction relative to the flow of fluid through the nozzle, so that the impingement of fluid against the traveling web will be at an angle to the direction in which the web travels across the nozzle. Such angular impringement can cause undesirable lateral movement of the web as it travels over a number of nozzles which are normally positioned in longitudinal side-by-side relation. It is common to circulate fluid in different directions through alternate nozzles to neutralize the effects of the impingement forces which tend to move the web in lateral directions. The orifices of the nozzles shown in FIGS. 7 and 8, generally lie in planes which are parallel to the longitudinal axis of the nozzle and normal to the direction of travel of the web.

Figure 9:
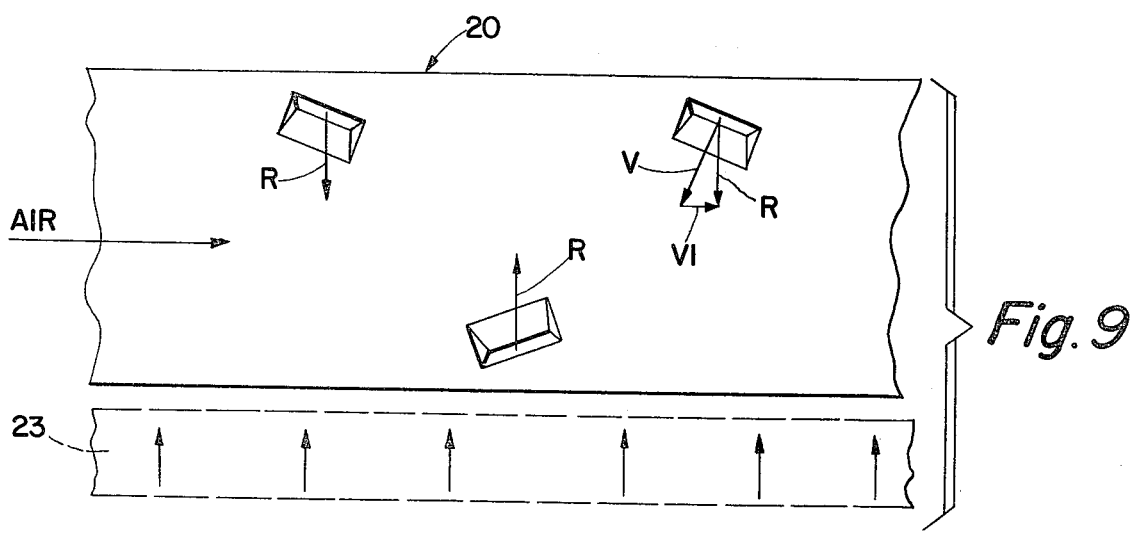
FIG. 9 is a plan view of a portion of a nozzle which is similar to the nozzle of FIGS. 7 and 8, but which employs the invention.

With reference to FIG. 9, there is shown how the nozzle of FIGS. 7 and 8 can be adapted to the inventive concept by placing the orifices in angular relation to the longitudinal axis of the nozzle, so that the resultant velocity vector R lies in a plane which is substantially parallel to the direction in which the web travels, thereby eliminating any undesirable lateral forces against the traveling web.

A number of tests were made to verify the inventive concept, as presented above, and the results of these tests are listed below. The nozzles used in the test were provided with spherically concave orifices like those shown in FIG. 4. The openings of these orifices were tilted backwardly at an angle A of about 20°. The angle of fluid flow from the orifices, under different fluid flow conditions, was predicted using the inventive concept. Air was then circulated through the nozzle, and the actual angles of fluid flow from the orifice were measured and compared with the predictions. It can be appreciated from the column marked percent deviation of the actual measured angle from the predicted angle, that in all but one case there were minimal deviations not exceeding 3½% and in two cases there was only a 0.5% deviation.

| Trial | Static Pressure ("W.G.) | Horizontal Velocity (F.P.M.) | Vertical Velocity (F.P.M.) | Predicted Angle (θp) | Measured Angle (θm) | % Deviation From θP |
|---|---|---|---|---|---|---|
| 1 | 0.46 | 802 | 2715 | 85 | 82 | −3.5 |
| 2 | 0.85 | 1079 | 3691 | 88 | 85 | −3.4 |
| 3 | 0.95 | 1255 | 3902 | 89 | 87 | −2.2 |
| 4 | 1.12 | 1312 | 4237 | 86.5 | 87 | +0.5 |
| 5 | 0.76 | 1347 | 3490 | 92.5 | 89 | −5.9 |
| 6 | 0.96 | 1508 | 3922 | 93 | 91.5 | −1.6 |
| 7 | 0.98 | 1839 | 3922 | 97 | 95 | −2.0 |
| 8 | 0.98 | 2417 | 3922 | 105 | 105.5 | +0.5 |
| 9 | 0.45 | 2511 | 2685 | 120 | 124 | +3.3 |

Thus, there has been described a nozzle with a unique orifice design, wherein the orifice is positioned to produce a predetermined desired direction of flow from the nozzle for impingement against an adjacent traveling web.

What is claimed is:

1. A nozzle for impinging fluid against a web traveling adjacent thereto, comprising a housing having a wall which helps define a chamber through which fluid is circulated, under pressure, and a plurality of orifices disposed in the wall and communicating with the chamber and through which fluid passes from the chamber for impingement against the traveling web, and characterized by means for directing fluid from the plurality of orifices in a desired direction, including means for positioning the plurality of orifices so that the resultant vector (R) of vectors (V, V1) representing velocities due to static and dynamic fluid pressure at the orifices, is in said direction, and an annular ridge surrounding each of said orifices and projecting from the wall of the housing in a direction opposite the chamber.

2. A nozzle for impinging fluid against a web traveling adjacent thereto, comprising:
   (a) an elongated housing having a fluid emitting wall which at least partially encloses a chamber which extends longitudinally of the housing and through which fluid, under pressure, is circulated in one direction;
   (b) a plurality of orifices disposed in the wall in communication with the chamber and through which fluid, in the chamber, flows from the nozzle for impingement against the web, each of the orifices including an opening with leading and trailing edges which lie in a plane which is tilted backwardly at an acute angle (A) of less than 90° where the leading edge of the opening extends further into the chamber than the trailing edge; and
   (c) a fluid deflector connecting the wall and leading edge of each of the openings and extending generally from the plane of the wall into the chamber in a generally downstream direction, relative to the direction which the fluid circulates through the chamber.

3. The nozzle of claim 2, wherein each orifice includes a dimple-shaped cavity which is disposed in the wall and extends into the chamber and which is equally divided into an upstream portion and a downstream portion, and the opening is a generally circular opening located in the downstream portion of the cavity, and wherein the deflector includes the upstream portion of the cavity.

4. The nozzle of claim 3, wherein the opening of each orifice lies in a plane which is at an acute angle (A) in the range of from 10° to 20° measured from the plane of the wall.

5. The nozzle of claim 2, wherein each deflector includes a generally planar tab which connects the wall and leading edge of the opening and which extends from the wall into the chamber in a downstream direction.

6. The nozzle of claims 3 or 5, wherein the plane of each of the orifices is sufficiently tilted so that fluid emerges from the orifice in a direction which is substantially normal to a plane which generally contains the wall of the housing.

7. The nozzle of claims 3, or 5, which includes, an annular ridge surrounding each of said orifices and projecting from the wall of the housing in a direction opposite the chamber.

8. The nozzle of claim 2, wherein the orifices include a row of openings spaced along opposing longitudinal sides of the wall, the plane of each of the openings being angularly disposed to the direction of flow of fluid through the chamber such that fluid emerges from the openings in directions which are substantially normal to the direction of flow of fluid through the chamber.

9. A nozzle for impinging fluid against a web traveling adjacent thereto, comprising a housing having a generally planar wall which helps define a chamber through which fluid is circulated, under pressure, and a plurality of orifices disposed in the wall and communicating with the chamber and through which fluid passes from the chamber for impingement against the traveling web, and characterized by means for directing fluid from the plurality of orifices in a desired direction, said means including, in each orifice, a portion of the wall laterally formed to define a cavity extending out of the plane of the wall, a portion of each cavity defining an opening in a plane at an acute angle with respect to the plane of the wall so that the resultant vector (R) of vectors (V, VI) representing velocities due to static and dynamic fluid pressure at the orifices, is in said desired direction, each of said cavities being dimple-shaped and extending into the chamber, each opening having leading and trailing edges defining the plane of the opening which is tilted backwardly at an acute angle (A) of less than 90° so that the leading edge extends further into the chamber than the trailing edge and the velocity vector (V) due to static pressure, extends in a generally upstream direction, relative to the flow of fluid through the chamber, the angle (A) being measured from the plane of the opening in a downstream direction to the plane of the wall.

10. The nozzle of claim 9, wherein the opening lies in a plane which is at an angle (A) that is in the range of from 10° to 20°.

11. The nozzle of claim 9, wherein the cavities are each divided at their midpoints into an upstream portion and a downstream portion, relative to the flow of fluid in the chamber, and the openings are located in downstream portions of the cavities.

12. A nozzle for impinging fluid against a web traveling adjacent thereto, comprising a housing having a generally planar wall which helps define a chamber through which fluid is circulated, under pressure, and a plurality of orifices disposed in the wall and communicating with the chamber and through which fluid passes from the chamber for impingement against the traveling web, and characterized by means for directing fluid from the plurality of orifices in a desired direction, said means including, in each orifice, a portion of the wall laterally formed to define a cavity extending out of the plane of the wall, a portion of each cavity defining an opening in a plane at an acute angle with respect to the plane of the wall so that the resultant vector (R) of vectors (V, VI) representing velocities due to static and dynamic fluid pressure at the orifices, is in said desired direction, each of said cavities being dimple-shaped and extending outwardly from the chamber, each opening having leading and trailing edges defining the plane of the opening which is tilted backwardly at an acute angle (A) of less than 90° so that the leading edge is closer to the plane of the wall than the trailing edge and wherein the velocity vector (V) due to static pressure extends in a generally upstream direction, relative to the flow of fluid through the chamber, the angle (A) being measured from the plane of the opening in a downstream direction relative to the plane of the wall.

13. The nozzle of claim 9 or 12, wherein the resultant vectors (R) thereof, are substantially normal to the plane of the traveling web.

14. The nozzle of claim 9 or 12, wherein the resultant vectors (R) thereof, are each in a plane which is substantially parallel to the direction of travel of the web across the nozzle.

* * * * *